US006470330B1

United States Patent
Das et al.

(10) Patent No.: US 6,470,330 B1
(45) Date of Patent: Oct. 22, 2002

(54) DATABASE SYSTEM WITH METHODS FOR ESTIMATION AND USAGE OF INDEX PAGE CLUSTER RATIO (IPCR) AND DATA PAGE CLUSTER RATIO (DPCR)

(75) Inventors: Joydeep Das; Sudipto Rai Chowdhuri, both of Richmond, CA (US)

(73) Assignee: Sybase, Inc., Dublin, CA (US)

(*) Notice: Subject to any disclaimer, the term of this patent is extended or adjusted under 35 U.S.C. 154(b) by 0 days.

(21) Appl. No.: 09/432,292

(22) Filed: Nov. 2, 1999

Related U.S. Application Data (60) Provisional application No. 60/107,121, filed on Nov. 5, 1998.

(51) Int. Cl.[7] .................................................. G06F 17/30
(52) U.S. Cl. .................................................. 707/2; 707/4
(58) Field of Search ..................... 707/1–10, 100–102, 707/200–205

(56) References Cited

U.S. PATENT DOCUMENTS

| | | | |
|---|---|---|---|
| 5,043,872 A | * 8/1991 | Cheng et al. ................... 707/2 |
| 5,455,944 A | * 10/1995 | Haderle et al. ............. 395/600 |
| 5,504,887 A | * 4/1996 | Malhotra et al. ........... 707/205 |
| 5,758,146 A | 5/1998 | Schiefer et al. |
| 5,778,353 A | * 7/1998 | Schiefer et al. ................ 707/1 |
| 5,812,996 A | 9/1998 | Rubin et al. |
| 5,822,749 A | 10/1998 | Agarwal |
| 6,108,653 A | * 8/2000 | Pereira .......................... 707/7 |
| 6,154,600 A | * 11/2000 | Newman et al. ................ 386/4 |
| 6,199,063 B1 | * 3/2001 | Colby et al. ................... 707/4 |

OTHER PUBLICATIONS

"Sybase Adaptive Server Enterprise Performance and Tuning Guide," Sybase, Inc., pp. 3–16 to 3–18, 10–10 to 10–15, Sep. 1997.

Agarwal, B. and Wu, D., "Secrets of Sybase SQL Server, Part I," Database Programming and Design, v10, n5, pp. 38–44, May 1997.

Agarwal, B. and Wu, D., "Secrets of Sybase SQL Server, Part II," Database Programming and Design, v10, n6, pp. 50–56, Jun. 1997.

Swami, A. and Schiefer, K., "Estimating Page Fetches for Index Scans with Finite LRU Buffers," ACM SIGMOD International Conference on Management of Data, Minneapolis, Minnesota, May 24–27, 1994, pp. 173–184.

* cited by examiner

*Primary Examiner*—John Breene
*Assistant Examiner*—Harold E. Dodds, Jr.
(74) *Attorney, Agent, or Firm*—John A. Smart (57) ABSTRACT

A database system with improved query execution performance is described. In order to achieve as much accuracy as possible by optimizing large block I/O related query plans, the database system implements a methodology employing two new statistical measures for use in a database server. The first statistical measure, called "Data Page Cluster Ratio" (DPCR), indicates the "packing" of data pages by measuring the "clustering" property of the data pages, i.e., how well clustered the consecutive data pages of a given relational table are in the extents. The ratio is measured for data pages accesses either via a scan of an index or via a scan of the table. The second statistical measure, called Index Page Cluster Ratio (IPCR), indicates the "packing" of index leaf pages by measuring the "clustering" property of index pages, i.e., how well clustered the consecutive index leaf pages of a given relational table's index are in the extents. The ratio is measured for index leaf pages accesses via the scan of a non-clustered/clustered index. Additionally, another set of formulae is derived to use these statistical measures for the estimation of the number of I/Os in the optimizer's cost model. By employing these measures, the database server's optimizer can provide an intelligent way of considering and selecting useful large block I/O access strategies, thereby leading to increased performance gains during query execution.

42 Claims, 6 Drawing Sheets

DATABASE SYSTEM WITH METHODS FOR ESTIMATION AND USAGE OF INDEX PAGE CLUSTER RATIO (IPCR) AND DATA PAGE CLUSTER RATIO (DPCR)

RELATED APPLICATIONS

The present application claims the benefit of priority from and is related to the following commonly-owned U.S. provisional application: application Ser. No. 60/107,121, filed Nov. 5, 1998. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to retrieval of information stored in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems,* Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ are available from Sybase, Inc. of Emeryville, Calif.

As the migration to client/server continues, each day more and more businesses are run from mission-critical systems which store information on server-based SQL database systems, such as Sybase Adaptive Server™. As a result, increasingly higher demands are being placed on server-based SQL database systems to provide enterprise-wide decision support. Accordingly, there is much interest in improving the performance of such system, particularly in terms of execution speed and reliability.

SUMMARY OF THE INVENTION

In current RDBMS deployments, the usage of decision support queries is becoming increasingly significant. One of the key components of these deployments is very good performance via superior optimization and data retrieval techniques. A very popular technique used to boost performance is the concept of using large buffer sizes to fetch larger chunks of data, thus reducing the number of I/O activity. This technique is commonly referred to as "large block I/Os". However, the performance gains from large block I/Os is limited to the quality of the underlying query plan—that is, a query plan with optimal large block I/O strategy will provide the relevant benefits whereas a query plan with sub-optimal large block I/O strategy could lead to performance degradation. This decision, which is typically made by the "query optimizer" module of a database system, is usually based on available statistical measures of the data. Therefore, the accuracy and smart usage of the statistical measures are critical to the generation of optimal query plans.

The present invention comprises a database system with improved query execution performance. In order to achieve as much accuracy as possible by optimizing large block I/O related query plans, the database system implements a methodology employing two new statistical measures for use in a database server. The first statistical measure, called "Data Page Cluster Ratio" (DPCR), indicates the "packing" of data pages by measuring the "clustering" property of the data pages, i.e., how well clustered the consecutive data pages of a given relational table are in a fixed group of pages called "extents." The ratio is measured for data page accesses either via a scan of an index or via a scan of the table. The second statistical measure, called Index Page Cluster Ratio (IPCR), indicates the "packing" of index leaf pages by measuring the "clustering" property of index pages, i.e., how well clustered the consecutive index leaf pages of a given relational table's index are in the extents. The ratio is measured for index leaf page accesses via the scan of a non-clustered/clustered index. Additional formulae have been derived in the optimizer's cost model that use these statistical measures to estimate the number of I/Os.

More particularly, the Data Page Cluster Ratio (DPCR) for an index (non-clustered or clustered) indicates the ordering and density of data pages in extents with respect to the data access via the given index i.e., how well the data pages are clustered in extents with respect to the order of the index rows. In other words, the DPCR is a measure of data page accesses that do not require more large block I/Os than necessary (i.e., the lower the DPCR, the greater the requirement for additional large block I/Os and vice-versa). In an exemplary embodiment, the database system maintains data page cluster ratios for every non-clustered and placement index on a table. It also maintains this ratio for the data page chains, if any. This ratio is gathered on a per-index basis (including one for the data pages of a table) whenever an index is created or whenever the statistics for a table/index is updated.

The Index Page Cluster Ratio (IPCR) for an index (non-clustered and clustered index) indicates the ordering and density of index leaf pages in extents with respect to the index page accesses via the given index. In other words, the IPCR is a measure of index leaf page accesses that do not require extra physical extent I/Os. In an exemplary embodiment, the database system maintains an index page cluster ratio for every clustered/non-clustered index. The index page cluster ratio is gathered on a per-index basis whenever an index is created or the statistics for a table/index is updated.

The cluster ratios are not maintained in the system statistics catalog, SYSTABSTATS. Instead, only the raw numbers for the ratios are maintained in the SYSTABSTATS catalog. With every insert/delete/update operation, the raw numbers are dynamically updated. The cluster ratios are derived on-the-fly from the current raw numbers every time the optimizer calls the statistics module via an st_gettabstatsinfo( ) method call. The derived cluster ratio is then used in the query optimizer's cost estimates to decide if a large block I/O for a given access path is feasible and cheap. The optimizer evaluates this fact in two different phases of the optimization process. The first time this is evaluated during index selection, i.e., when the optimizer decides on the cheapest index to select for a given query. Here, after applying an initial cost estimate for the index path, the DPCR/IPCR ratios are used to factor in the effect of large block reads. Later, the optimizer evaluates the cost of doing a disk read (physical I/O) during join enumeration (applicable for the various join enumerations). Here also DPCR/IPCR are factored into the physical I/O estimations. By employing these measures, the database server's optimizer can provide an intelligent way of considering and selecting useful large block I/O access strategies, thereby leading to increased performance gains during query execution.

GLOSSARY

ASE 11.9: Sybase Adaptive Server Enterprise version 11.9.
DSS: Decision support system.
OLTP: Online transaction processing system.
I/O: Refers to the Input and Output operations in a database system.
Logical I/O: Refers to the I/O operation to/from the main memory.
Physical I/O: Refers to the I/O operation to/from the disk.
RDBMS: Relational Database Management System.
Large block I/Os: Whenever I/Os are performed using page sizes in multiples of standard page size, it is referred to as large block I/Os.
Clustered Index: A type of index created on RDBMS tables which tries to ensure that the data rows accessed via this index are well ordered or "clustered" together.
Non-Clustered Index: A type of index created on RDBMS tables where the index does not guarantee that the data rows accessed via the index are well "clustered".
Query Optimizer: The module of the RDBMS that decides on an optimal strategy for data access.
All pages Table: A format of tables where the locking scheme employed locks both the index and data pages. The clustered index in these tables guarantee 100% ordering of the data rows.
Data-Only Locked Tables: A format of tables where the locking scheme employed locks only the data pages or the data rows. The clustered index in these tables try to maintain ordering for data rows but do not guarantee such ordering.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment requiring optimization of information retrieval. The description of the exemplary embodiments which follows is, therefore, for the purpose of illustration and not limitation.

Standalone System Hardware

Figure 1A:
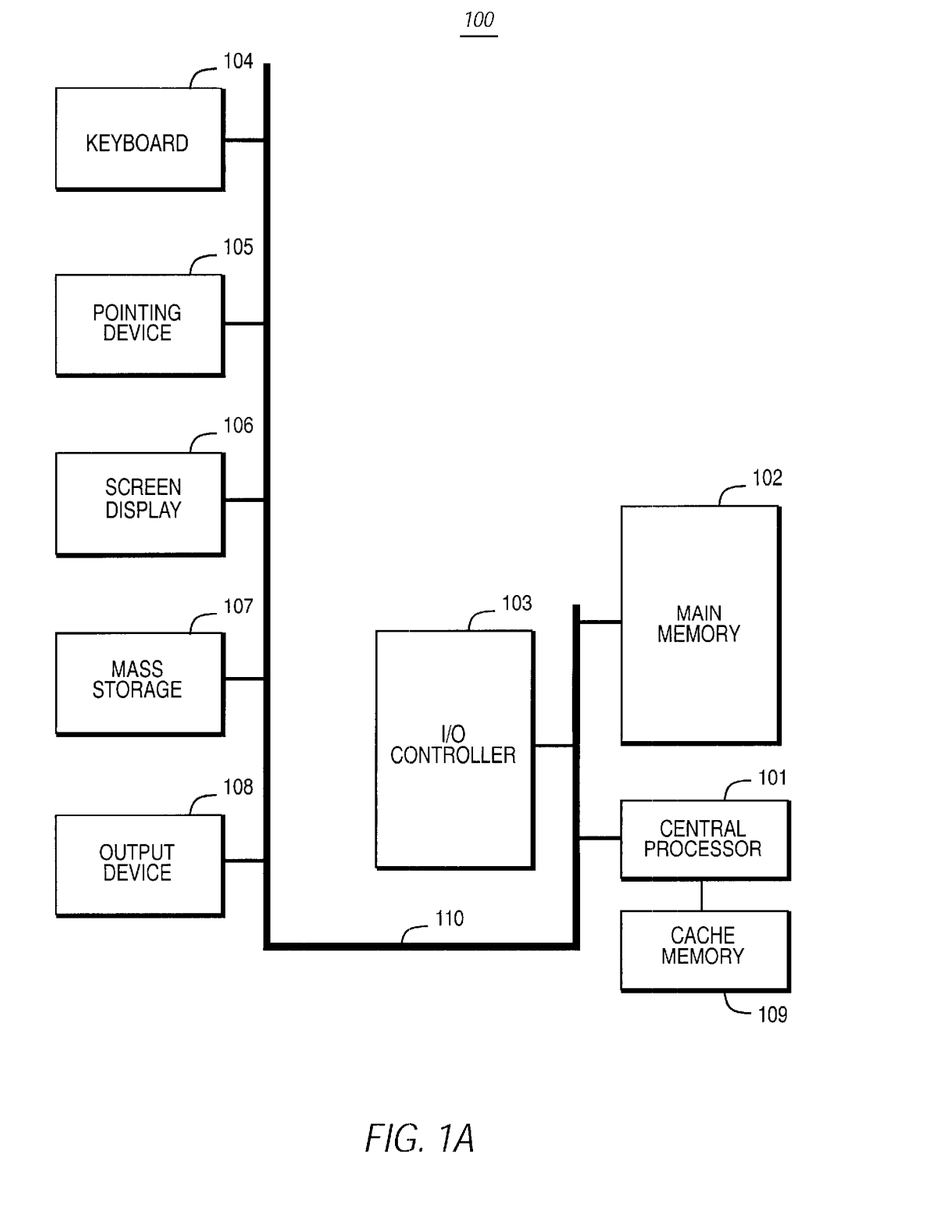
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
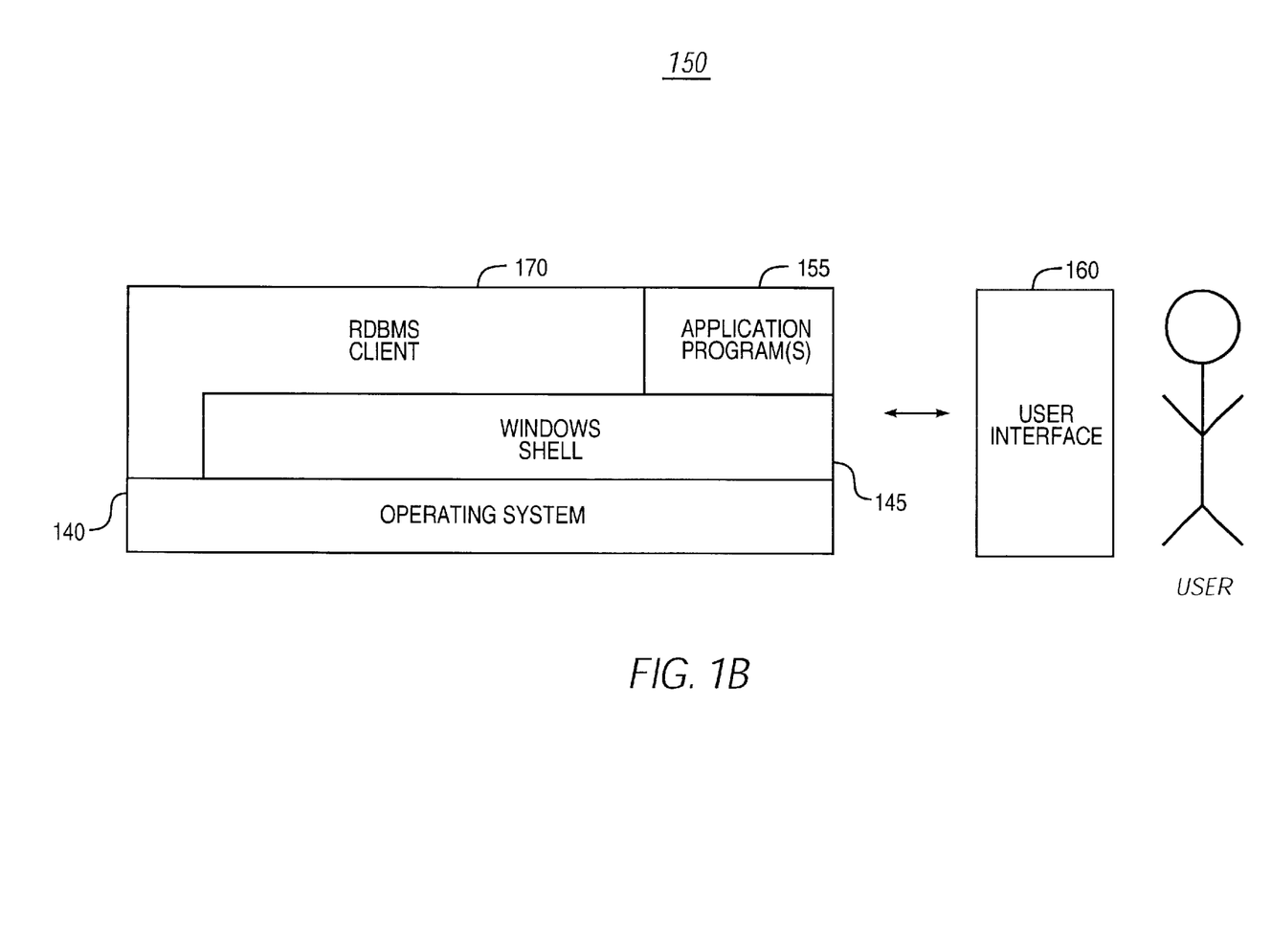
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a window-based or graphical user interface shell 145. One or more application programs, such as application software 155, may be "loaded" (i.e., transferred from storage 107 into memory 102) for execution by the system 100. The system also includes a user interface 160 for receiving user commands as input and displaying user data as output.

Also shown, the software system 150 includes a Relational Database Management System (RDBMS) front-end or client 170. The RDBMS front-end 170 may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2:
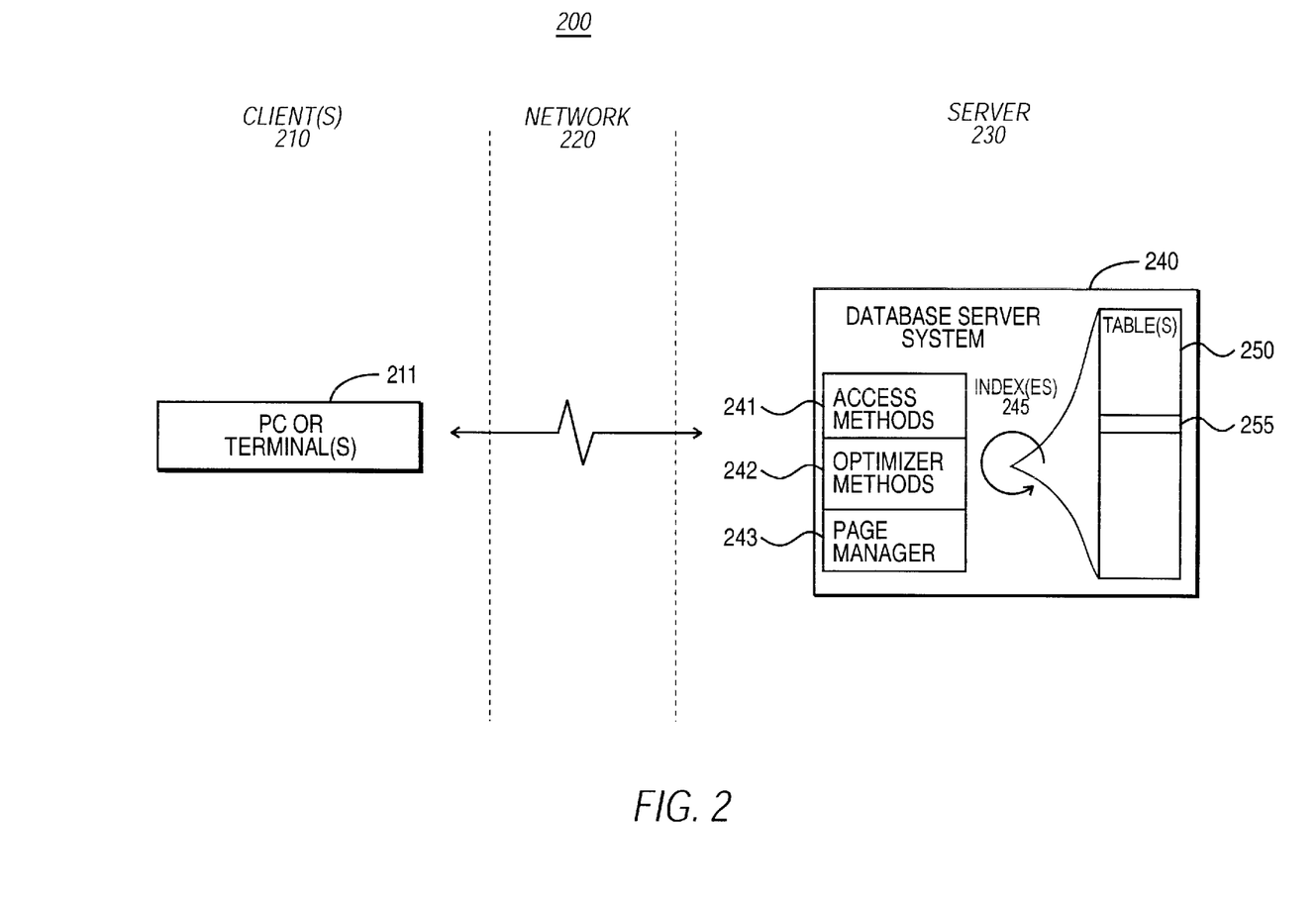
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows for PC clients.

The Database Server System 240, which comprises Sybase Adaptive Server™ (Sybase of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or records (tuples); each record comprises columns or fields of information. A database record, therefore, includes information which is most conveniently represented as a single unit. A record for an employee, for example, may include information about the employee's ID Number, Last Name and First Initial, Position, Date Hired, Social Security Number, and Salary. Thus, a typical record includes several categories or fields of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and processes particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

As clients insert more and more data into the table 250, the index 245 continues to grow. Specific parts of the Database Server System 240 play a central role in the accessing and managing tables and indexes: Access Methods 241, Optimizer Methods 242, and Page Manager 243. For example, when a request from a client to insert a new row (i.e., record) into the table occurs in the system, the request is optimized by the Optimizer Methods 242, which select an optimal access path for accessing the table. Actual access occurs through the Access Methods 241, which may employ an index (e.g., index 245) for determining on which of the leaf-level pages (e.g., clustered index) a particular row should be inserted. If sufficient space exists on the particular page located, then the Access Methods do not require the assistance of the Page Manager 243. The row is simply inserted into the located page, at the appropriate storage space or "slot" available at that page. The process may continue in this manner until a row arrives for insertion which cannot fit on the existing page. Here, the Access Methods seek assistance from the Page Manager for allocating a new page (which is now needed, at this point, for the table). As the client continues to add more and more rows, the table continues to grow and the process repeats. This operation occurs very frequently in practically all on-line transaction processing (OLTP) systems. The following discussion focuses on modifications to the system 200, for providing improved query execution performance.

Query Optimization

A. Introduction to Database Input/Output (I/O)

In current RDBMS deployments, the usage of decision support queries is becoming increasingly significant. One of the key components of these deployments is very good performance via superior optimization and data retrieval techniques. A very popular technique used to boost performance is the concept of using large buffer sizes to fetch larger chunks of data, thus reducing the number of I/O activity. This technique is commonly referred to as "large block I/Os". However, the performance gains from large block I/Os is limited to the quality of the underlying query plan—that is, a query plan with optimal large block I/O strategy will provide the relevant benefits whereas a query plan with sub-optimal large block I/O strategy could lead to performance degradation. This decision, which is typically made by the "query optimizer" module of a database system, is usually based on available statistical measures of the data. Therefore, the accuracy and smart usage of the statistical measures are critical to the generation of optimal query plans.

Many commercial implementations of RDBMSs typically use a statistical measure called "Data Cluster Ratio" to make this decision. However, this "single" statistical measure is used to make "multiple" decisions, and although this measure is good for estimating ordinary page I/Os (i.e., the I/O blocks size equals the standard page size of the system), it does not apply very well when making decisions regarding large block I/Os. In order to understand this, it is important to note that in most RDBMSs, pages of an object belong to larger entities sometimes referred to as "extents". Hence, to have useful large block I/O accesses in units of "extents", it is better if the pages of a database object are well "packed," that is, packed together in a given order into as few extents as possible. In essence, the better the packing, the fewer the number of I/Os required and vice-versa.

Almost all activities in an RDBMS translate to Input and Output (I/O) operations. These operations are done in units of pages, which themselves are generally grouped in larger chunks of data and stored on disks. In Sybase ASE 11.9, for instance, the size of a page is 2 KB (kilobytes) and the size of an "extent" or chunk is 16 KB (i.e, each extent has 8 standard 2 KB-sized pages). Although I/O operations may find sought-after data objects in the main memory (logical I/O), more often the sought-after data objects have to be fetched/written from/to disks. These disk I/O (physical I/O) operations are expensive. Accordingly, it is desirable to find ways to minimize the number of such operations to alleviate their negative impact on performance of the system.

The approach adopted in many systems is to read the pages from the disks in large chunks. Generally, the nature of the queries plays a role in the relevance of fetching pages in larger chunks. Queries that tend to read large sections of sequential data (e.g., DSS-style) will benefit more from large block I/Os than others (e.g., OLTP queries). However, reading in large chunks also involves usage of resources and has its own associated costs. This is especially true in cases where a given extent may not contain all the contiguous pages of a relational table. Therefore, fetching in large blocks in such cases results in fetching more pages than are actually accessed, leading to many large block "jumps" as the relevant page accesses will not be contiguous. Additionally, this may lead to wastage of buffer resources (system memory), thereby degrading the overall performance of the system. Hence, choosing a correct strategy to read in the data in large chunks is extremely important for the overall performance of an RDBMS. The decision to choose this strategy is usually taken by the Query Optimizer module of the system and is reflected in the query plan generated by this module. Choosing the right strategy either involves using a set of heuristic rules or performing a systematic cost analysis in the Optimizer. In Sybase ASE, for instance, the latter approach has been adopted. However, the cost analysis approach can only be as accurate as the statistical measures and the cost model that is employed.

B. Improved Optimization Using Cluster Ratios

In order to achieve as much accuracy as possible by optimizing large block I/O related query plans, the present invention introduces a methodology employing two new statistical measures for use in a database server (e.g., Sybase ASE 11.9). The first statistical measure is called "Data Page Cluster Ratio" (DPCR). This ratio indicates the "packing" of data pages by measuring the "clustering" property of the data pages, i.e., how well clustered the consecutive data pages of a given relational table are in the extents. The ratio is measured for data pages accesses either via a scan of an index or via a scan of the table. The second statistical measure is called Index Page Cluster Ratio (IPCR). This ratio indicates the "packing" of index leaf pages by measuring the "clustering" property of index pages, i.e., how well clustered the consecutive index leaf pages of a given relational table's index are in the extents. The ratio is measured for index leaf pages accesses via the scan of a non-clustered/clustered index. Additional formulae have been derived in the optimizer's cost model that uses these statistical measures to estimate the number of I/Os. By employing these measures, the database server's optimizer can provide an intelligent way of considering and selecting useful large block I/O access strategies, thereby leading to increased performance gains during query execution.

C. Data Page Cluster Ratio

1. Definition and Overview

The Data Page Cluster Ratio may be defined as follows.

Data Page Cluster Ratio (DPCR): The data page cluster ratio for an index (non-clustered or clustered) indicates the ordering and density of data pages in extents with respect to the data access via the given index i.e., how well the data pages are clustered in extents with respect to the order of the index rows.

In other words, the DPCR is a measure of data page accesses that do not require extra large block I/Os. In an exemplary embodiment, the database system maintains data page cluster ratios for every non-clustered and placement index on a table. It also maintains this ratio for the data page chains in "Allpages" tables. This ratio is gathered on a per-index basis (including one for the data pages of a table) whenever an index is created or whenever the statistics for a table/index is updated.

The Index Page Cluster Ratio (IPCR) may be defined as follows.

Index page cluster ratio (IPCR): The index page cluster ratio for an index (non-clustered and clustered index on Data-Only locked tables) indicates the ordering and density of index leaf pages in extents with respect to the index page accesses via the given index.

In other words, the IPCR is a measure of index leaf page accesses that do not require more large block I/Os than necessary (i.e., the lower the IPCR, the greater the requirement for additional large block I/Os). In an exemplary embodiment, the database system maintains an index page cluster ratio for every clustered index on "Datapages" and "Datarows" locked tables and non-clustered indexes on tables of all three locking schemes. The index page cluster ratio is gathered on a per-index basis whenever an index is created or the statistics for a table/index is updated.

2. DPCR for Non-clustered or Placement Indexes

Figure 3:
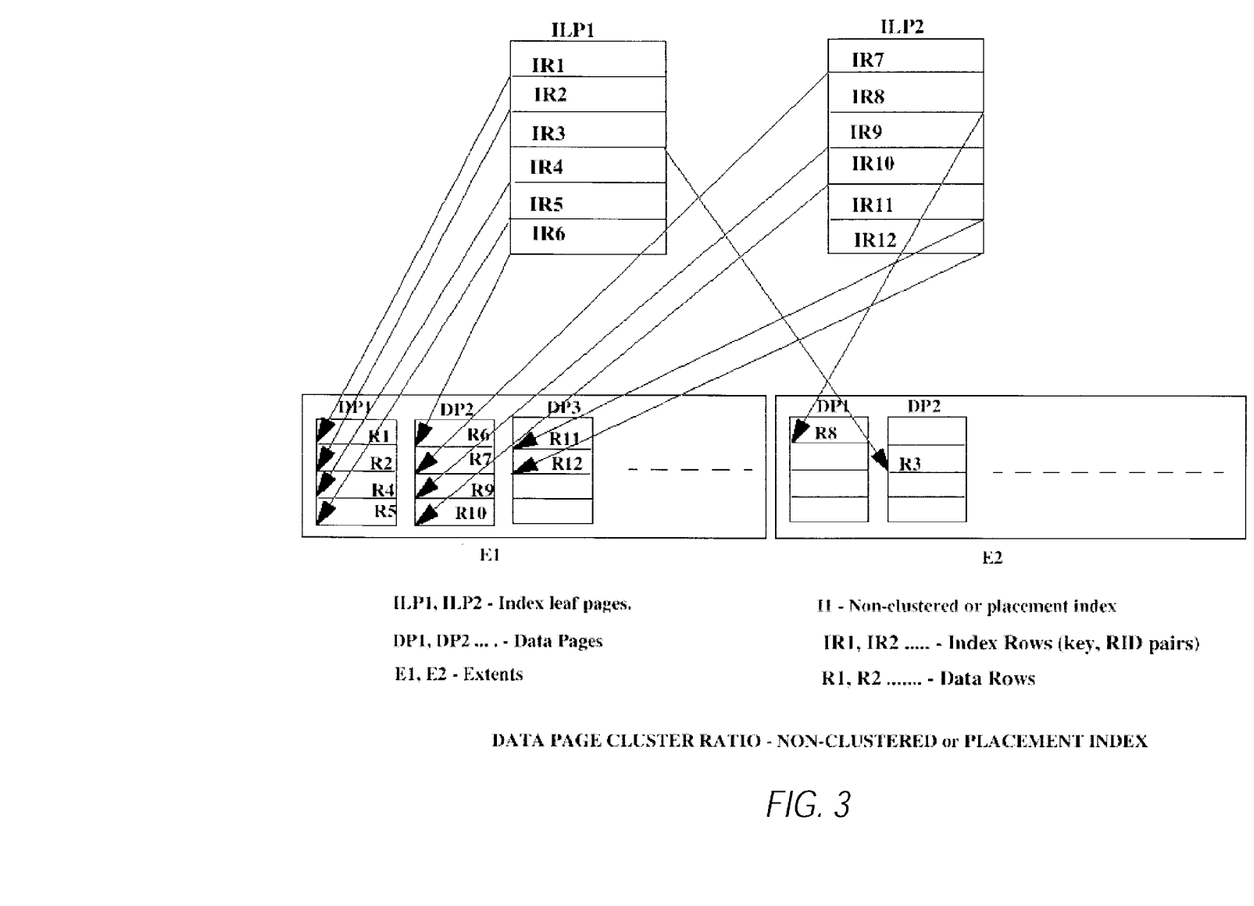
FIG. 3 is a block diagram illustrating that less I/Os are required if the data pages required to be fetched are well clustered in the extents in the order of the index rows, i.e., if the data page cluster ratio is high.

The Data Page Cluster Ratio (DPCR) for an index (non-clustered or placement) indicates the order and density of data pages in the extents with respect to the ordering of the index rows. Consider FIG. 3 illustrating a table with twelve data rows (R1–R12), five (data pages DP1–3 of extent E1 and DP1–2 of extent E2), and two index leaf pages (ILP1–2), where the data come from two extents. Suppose the data rows are accessed (using extent I/O—a large block I/O with block size equal to extent size) via an index I1. Initially, an extent I/O (read) is done to fetch E1 The data rows (i.e., R1, R2, etc.) are then accessed from the pages in this extent in the index order. However, reading two of the data rows R3 and R8 in the index key order will require additional physical extent I/Os if extent is not in the buffer cache. This is because the data access will need to jump from extent E1(DP1) to E2(DP2) and then back to E1(DP1). Thus as can be seen, the extra I/Os are less if the data pages are well clustered in the extents in the order of the index rows, i.e., if the data page cluster ratio is high.

3. DPCR for Data Pages

Figure 4:
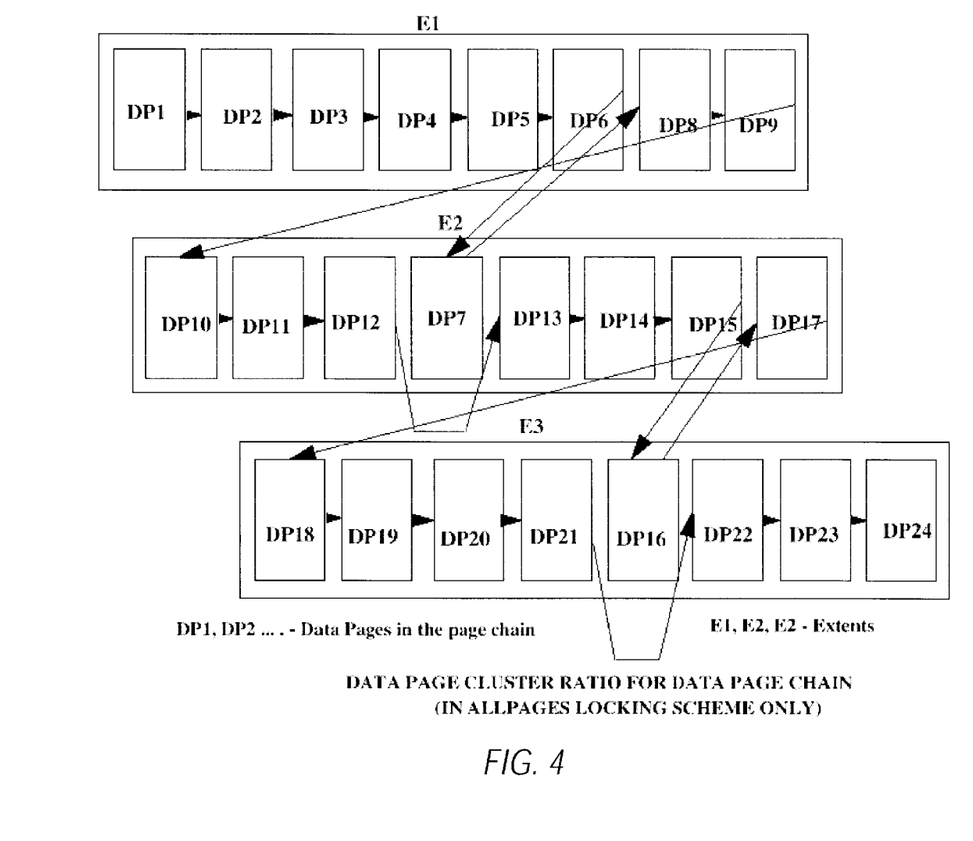
FIG. 4 is a block diagram illustrating that the required I/Os are minimized if the data pages in the chain are well clustered, i.e., if the data page cluster ratio is high.

In Allpages locking scheme, the data page cluster ratio is maintained for the data page chain in a table. This ratio indicates the ordering and density of data pages in the extents with respect to the order of the page chain. Consider FIG. 4 showing data pages linked in the chain. Suppose one employs extent I/O to access the data pages (either via a clustered index or table scan), then initially extent E1 is fetched to access the first page. The page chain is then followed to access the remaining pages. Here, pages DP7 and DP16 are not in the same extents as their neighboring pages. Since the access sequence will have to jump between the extents to access these data pages, extra physical extent I/Os may be incurred if the extent is not in cache. The extra I/Os are minimized if the data pages in the chain are well clustered, i.e., if the data page cluster ratio is high. In Data-Only locked tables, the data pages are not linked in a page chain. The data page cluster ratio in these tables indicate the density of the data pages in the extents such that when accessed via table scan successive data page accesses are from the same extent.

Figure 5:
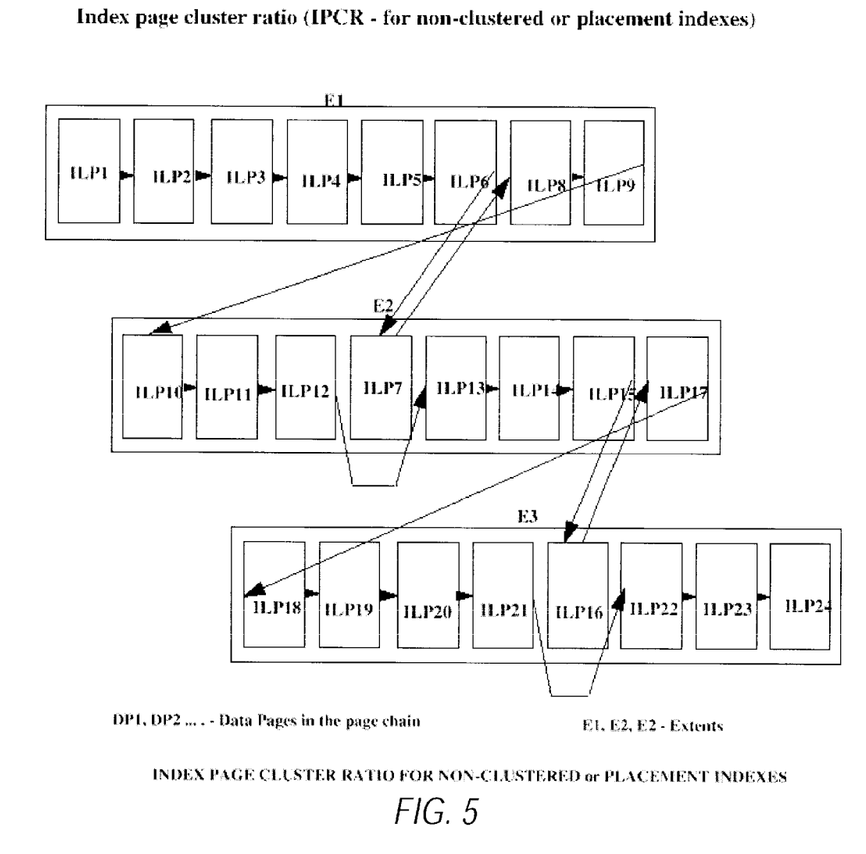
FIG. 5 is a block diagram illustrating that the required I/Os are minimized if the leaf pages are well clustered, i.e., if the index page cluster ratio is high.

The index page cluster ratio indicates the ordering and density of index leaf pages in the extents with respect to the leaf page chain. Consider FIG. 5. Suppose one employs extent I/O, then initially extent E1 (ILP1–ILP6) is fetched to access the first six leaf pages. The page chain is then followed to access the remaining leaf pages. Here, leaf pages ILP7 and ILP16 are not in the same extents as their neighboring leaf pages. Since the access sequence will have to jump between the extents to access these leaf pages, extra physical extent I/Os may be incurred if the next extent is not in the cache. The extra I/Os are minimized if the leaf pages are well clustered, i.e., if the index page cluster ratio is high.

D. DPCR/IPCR Formulae

1. Statistical Derivation

The statistical formulae for the Data Page Cluster Ratio (DPCR) and the Index Page Cluster Ratio (IPCR) may be derived as follows.

(1) Page Chains:

$$DPCR = \frac{TS\_DPAGECT - TS\_DEXTENT\_EXTRAIO}{TS\_DPAGECT - PAGECEIL(TS\_DPAGECT - TS\_DEMPTYPGCT - FWRW\_DPGS)}$$

(2) Non-Clustered/Data-Only Clustered Indexes:

$$DPCR = \frac{TS\_DPAGE\_EXTRAIO - TS\_DEXTENT\_EXTRAIO}{TS\_DPAGE\_EXTRAIO - PAGECEIL(TS\_DPAGECT - TS\_DEMPTYPGCT - FWRW\_DPGS)}$$

(3) Non-Clustered/Data-Only Clustered Indexes:

$$IPCR = \frac{TS\_LEAFPGCT - TS\_IEXTENT\_EXTRAIO}{TS\_LEAFPGCT - PAGECEIL(TS\_LEAFPGCT - TS\_IEMPTYPGCT)}$$

Here, the numerator indicates the number of page accesses that do not require extra extent fetches, and the denominator indicates maximum the number of pages that do not require extra extent fetches. TS_DEXTRA_EXTRAIO is the number of illegal extent cross overs for data pages in Data-Only locked table or nonclustered indexes in Allpages table; TS_DPAGE_EXTRAIO is the number of illegal page cross overs for data rows in Data-Only locked table or nonclustered indexes in Allpages table; TS_DPAGECT/TS_LEAFPGCT is the number of data pages/index leaf pages in table/index; TS_DEMPTYPGCT/TS_IEMPTYPGCT is the number of empty data/index pages in table; FRW_DPGS is the number of data pages containing forwarded rows; TS_IEXTRA_EXTRAIO is the number of illegal extent cross overs for index leaf pages in nonclustered/placement indexes; and PAGECEIL(P) represents (P+# of Pages in Extent −1)/(# of Pages in Extent).

2. Source Code Representation (a) Data Structures

At the outset, a tabstatrow data structure is defined for tracking table statistics, as follows.

```
typedef struct tabstatrow
{
    //.................
    /* # of index leaf pages for non-clustered index / data
    ** pages for clustered index
    */
    pagect_t t_nidpages;
    /* # of data pages for a nonclustered/placement index */
    pagect_t t_ndpages;
    /* number of (il)legal index extent crossovers */
    pagect_t t_idextent_extraio;
    /* # of (il)legal data extent crossovers ** for nc / place-
       ment index
    */
    pagect_t t_dextent_extraio;
    /* # of (il)legal page cross overs for the data rows */
    pagect_t t_page_extraio;
    /* empty page count */
    uint32 t_emptypgcnt;
    //............
}
```

As shown, the data structure includes data members for tracking the number of index leaf pages for a non-clustered index as well as the number of data pages for both clustered and non-clustered indexes.

(b) Function: Read Table Statistics

Next, a method, ST_READTABSTATS, is defined for reading the statistics for a given table.

```
/* ST_READTABSTATS
**
Routine to read SYSTABSTATS information and populate
    the systabstats descriptors for a given table. The systab-
    stats table has a row corresponding to each index entry in
    sysindexes. For every row in systabstats for a given table,
    we read and populate a linked list.
```

```
**
** Returns: TRUE : if successful; FALSE : otherwise
** Side effect: None
*/
st_readtabstats(
    ST_SYSTABSTATS **st_systabstatsp, PROC_HDR
      *phdr,
    VRANGE *rg, dbid_t dbid, objid_t tabid, SDES *sdes,
    DBTABLE *dbtablep)
LOCALPSS(pss); /* initialize local copy of global Pss */
//..........
if (systabstats_row.ts_indid <= CLUSTIND)
{
    forw_row_pgs = st_getpgs_forwrows( data_row_cnt,
      (data_pg_cnt - empty_data_pg_cnt),
      forw_rows, datarow_sz,
      lst_systabstatsp->st_oampagect);
    lst_systabstatsp->st_dpageratio =
      ((double)systabstats_row.ts_pagect -
      (double)systabstats_row.ts_dextent_extraio)/
      NO_DIV_ZERO( (double)systabstats_row.ts_
        pagect -
      (double) (PAGECEIL( systabstats_row.ts_pagect -
      empty_data_pg_cnt - forw_row_pgs)));
    //..........
}
else
{
/*
** Case for non-clustered/placement index
*/
lst_systabstatsp->st_dpageratio =(
    (double)systabstats_row.ts_page_extraio -(
    double)systabstats_row. ts_dextent_extraio)/
    NO_DIV_ZERO( (double)systabstats_row.ts_page_
      extraio -(
    double)(PAGECEIL(systabstats_row.ts_pagect-empty_
      data_pg_ cnt - forw_row_pgs)));
//........
}
//........
}
```

(c) DPCR/IPCR Runtime Usage

The cluster ratio is derived "on-the-fly" every time the optimizer calls the statistics module via an st_gettabstatsinfo( ) method call. The derived cluster ratio is then used in the query optimizer's cost estimates to decide if a large block I/O for a given access path is feasible and cheap. The optimizer evaluates this fact in two different phases of the optimization process. The first time this is evaluated during index selection, i.e., when the optimizer decides on the cheapest index to select for a given query. Here, after applying an initial cost estimate for the index path, the DPCR/IPCR ratios are used to factor in the effect of large block reads. Later, the optimizer evaluates the cost of doing a disk read (physical I/O) during join enumeration. Here also DPCR/IPCR are factored into the physical I/O estimations.

(d) DPCR/IPCR Usage Formulae Derivation

PFIO(Table/Scans/Allpages Clustered index scans) =

$$\frac{((2K\_DIO - NPFDIO) * DPCR)}{BLKSIZE} + (1 - DPCR) * 2K\_DIO + NPFDIO$$

PFIO(Nonclustered/Data − Only Clustered index covered scans) =

$$\frac{((2K\_IXIO - NPFIXIO) * IPCR)}{BLKSIZE} + (1 - IPCR) * 2K\_IXIO + NPFIXIO$$

PFIO(Nonclustered/Data -Only Clustered index non-covered scans) =

$$\frac{((2K\_IXIO - NPFIXIO) * IPCR)}{BLKSIZE} + (1 - IPCR) * 2K\_IXIO + NPFIXIO +$$

$$\frac{((2K\_DIO - NPFDIO) * DPCR)}{BLKSIZE} + (1 - DPCR) * 2K\_DIO + NPFDIO$$

Here, 2K_DIO represents the data page estimate in 2 Kbytes page units; 2K_IXIO represents the index page estimate in 2 K page units; BLKSIZE represents the large I/O block size in units of 4 KB, 8 KB or 16 KB, NPFDIO represents the data pages that cannot be read in large blocks (e.g., allocation pages and the like); NPFIXIO represents the index pages that cannot be read in large blocks like non-leaf pages; IPCR represents the index page cluster ratio; DPCR represents the data page cluster ratio; and PFIO represents the I/O estimate after factoring in large block fetches.

(e) DPCR/IPCR Usage Source Code

1. Macros

The following macro returns the I/O estimate if a sequential prefetch (large I/O) strategy is employed for a scan of index/data pages.

```
/* IOEST_PRFTCH_SCAN( pages, mass_sz, page_
      cluster_ratio, ioest )
** This is used in : Table scans, Clustered, Nonclustered and
      Placement index scans.
*/
# define IOEST_PRFTCH_SCAN( pages, mass_sz,
      page_cluster_ratio, ioest )
{
( ioest ) = ( ( IOEST_PRFTCH_PGS( pages, page_
      cluster_ratio ) ) /
( pagect_t ) PAGES_FOR_KBYTES(( uint32 ) ( mass_sz
      ) ) ) );
( ioest ) += ( IOEST_XTRAPRFTCH_PGS( pages, page_
      cluster_ratio ) );
}
```

The following macro returns an estimate of the number of large I/Os that have to be done for the pages that are well clustered with respect to the extents.

```
/* IOEST_PRFTCH_PGS( pages, page_cluster_ratio )
# define IOEST_PRFTCH_PGS( pages, page_cluster_
      ratio )
( ( pages ) * ( page_cluster_ratio ) )
```

The following macro returns an estimate of the number of extra large I/Os that have to be done because of the pages that are not well clustered with respect to extents, i.e., consecutive page accesses will be from different large I/O buffers.

```
/* IOEST_XTRAPRFTCH_PGS( pages, page_cluster_
      ratio )
*/
# define IOEST_XTRAPRFTCH_PGS( pages, page_
      cluster_ratio )
```

```
( ( pages ) * ( 1.0 - ( page_cluster_ratio ) ) )
```
The following macro returns the estimate of the data pages that cannot be prefetched (via large I/O) in a scan. These pages include: (a) OAM pages + ALLOCATION pages for an OAM scan, and (b) All pages of the data pages of the table in extent0, i.e., in the same extent as the allocation pages.
```
/*
    IOEST_NONPRFTCHABLE_DPAGES( st_systabstatsp,
        scanpct )
*/
# define IOEST_NONPRFTCHABLE_DPAGES(st_
    systabstatsp, scanpct )
( ( st_systabstatsp ) ? ( floor ( ( scanpct ) *
( ( ( st_systabstatsp )->st_ext0pgct ) +
( ( st_systabstatsp )->st_oampagect ) ) ) ) : 0.0
```

2. Usage During Index Selection

A q_scancost function is used to compute the scan cost given the number of pages and prefetch size. It may be constructed as follows (e.g., using the C programming language).
```
/*
** q_scancost
**
** Purpose: Compute the scan cost given number of pages
    and prefetch size.
** Parameters: VRANGE *rg, COST *costp
** Returns: Cost in terms of number of estimated logical
    I/Os
** Side Effects: None
*/
pagect_t
q_scancost(VRANGE * rg, COST * costp, SDES * sob-
    jscore )
{
    //........
    /*
    ** Factor in sequential prefetch estimate if chosen. For
        work and fake table use
    **magic Page Cluster Ratio of MAGIC_CLUSTER_
        RATIO
    */
    if ( ( ( ( rg->rgtabid <0 ) || ( rg->rgstat & ( RG_FAKEOBJ |
        RG_TMP_TO_BE ) ) ) &&
        costp->cstrategy & I_SEQ_DTPREFETCH ) )
    {
        dpcr = MAGIC_CLUSTER_RATIO;
        IOEST_PRFTCH_SCAN(cpages, (double)costp-
            >cdfetchsize, dpcr, dioest );
        return( dioest );
    }
    /* Get the SYSTABSTATS handle */
    st_systabstatsp = st_gettabstatinfo(
rg->rgnondiskres->rgtabstatp->st_systabstats, costp-
    >cindid, sobjscore, 4 );
    SYB_ASSERT( st_systabstatsp );
    ipcr = st_systabstatsp->st_ipagecratio;
    dpcr = st_systabstatsp->st_dpagecratio;
    /*
    Returns the estimate of the number of pages required to
        scan using this index. This estimate is used for com-
        paring the different index scans and is not stored in
        cpages because logical reads are always in 2 K blocks.
        However, during join optimization and physical I/O
        estimation this factor will again be considered in con-
        text of cache size and the physical I/O estimate will be
        set accordingly. If the access does not use sequential
        prefetch then return from this function because we
        already have the page estimate. If sequential prefetch is
        considered then the estimate uses page cluster ratios to
        factor in the large I/Os.
    */
    if ( !( costp->cstrategy & ( I_SEQ_DTPREFETCH |
        I_SEQ_IXPREFETCH ) ) )
    {
        return( cpages );
    }
    /*The % of non-prefetchable pages is proportional to the
        scan size.
    Assume crows/totrows to provide an approximation of
        this %.*/
    if ( ( ( costp->cindid >TABENTRY ) && ( costp->cstrategy
        & ( I_SEQ_IXPREFETCH I I_SEQ_
        DTPREFETCH ) ) )
    {
        /*Get the SYSTABSTATS handle for indid =0 */
        tst_systabstatsp = st_gettabstatinfo(
            rg->rgnondiskres->rgtabstatp->st_systabstats,
            TABENTRY, sobjscore, 13 );
        SYB_ASSERT( tst_systabstatsp );
        npftchpct = ( tst_systabstatsp->st_rowct >costp-
            >crows ?
            costp->crows / tst_systabstatsp->st_rowct ) : 1.0 );
    }
    switch ( costp->cindid )
    {
        case TABENTRY:
            dioest = cpages;
            /* Get est. of data pgs that cannot be prefetched */
            npftchdpgs =
                IOEST_NONPRFTCHABLE_DPAGES(st_
                    systabstatsp,npftchpct );
            IOEST_PRFTCH_SCAN( ( dioest - npftchdpgs ),
                ( double )costp->cdfetchsize, dpcr, dioest );
            dioest += npftchdpgs;
            break;
        case CLUSTIND:
            ixioest = costp->cheight;
            dioest = cpages - costp->cheight;
            /* Get est. of data pgs that cannot be prefetched */
            npftchdpgs =
                IOEST_NONPRFTCHABLE_DPAGES(st_
                    systabstatsp, npftchpct );
            IOEST_PRFTCH_SCAN(( dioest - npftchdpgs ),
                ( double )costp->cdfetchsize, dpcr, dioest );
            dioest += npftchdpgs;
            break;
        default :
            ixioest = ( costp->clpages + costp->cheight );
            dioest = cpages - ixioest;
            if ( costp->cstrategy & I_SEQ_IXPREFETCH )
            {
                /* Get est. of index pgs that cannot be prefetched for
                    this scan*/
                npftchixpgs = IOEST_NONPRFTCHABLE_
                    IXPAGES(
                    st_systabstatsp, npftchpct );
                IOEST_PRFTCH_SCAN(( ixioest - npftchix-
                    pgs ),
                    ( double )costp->cifetchsize, ipcr, ixioest );
```

```
    ixioest += npftchixpgs;
  }
  if ( costp->cstrategy & I_SEQ_DTPREFETCH )
  {
    /* Get est. of data pgs that cannot be prefetched
       for given scan.
    */
    npftchdpgs =
      IOEST_NONPRFTCHABLE_DPAGES(
        st_systabstatsp, npftchpct );
      IOEST_PRFTCH_SCAN(( dioest - npftchdpgs ),
        ( double )costp->cdfetchsize,dpcr, dioest );
      dioest += npftchdpgs;
  }
  break;
  return( ixioest + dioest );
}
```

3. Usage During Physical I/O Estimation

A j_pio_estimate function is used to calculate number of physical I/Os for a search, join or an OR-clause access path for a given range entry. It may be constructed as follows.

```
/* J_PIO_ESTIMATE
**
Purpose: Calculate number of physical I/Os for a search, join
  or an OR-clause access path for a given range entry.
**
It takes into account amount of cache available for the given
  access and the Cluster Ratios (both row and page). In
  calculating the # of physical I/Os it considers the prefetch
  size as well. Hence both a small and large page I/O will
  derive a single physical I/O. It considers the index pages
  separately from the data pages as the index pages and data
  pages may be bound to separate caches. In estimating
  physical I/Os for join clauses the function takes care of the
  case when the inner table is probed in its physical order
  whereby subsequent scans can make use of the cache
  locality. If a cache is configured with multiple pools, all
  calculations are generally based on the availability of the
  buffers in the pool from which I/O requests are made.
Note: At run time if the requested I/O pool is full, the buffer
  manager will resort to the usage of the 2 K pool.
**
Parameters: j - global join structure for a given query block
** jplan - join plan for the given range entry.
**
Returns: Estimated # of physical I/Os (for a given fetch
  size).
Side Effects: None
*/
SYB_STATIC pagect_t
  j_pio_estimate(JOINDATA * j, JPLAN * jplan)
{
  //........
  if ( pcost->cindid >CLUSTIND )
  }
    /* Get index pages physical I/O estimate */
    ixpgest=j_ixpgs_pio_estimate (j, jplan, totixpgs,
      icsize, pagecount, FALSE);
    /*Factor in sequential prefetch blk sizes*/
    ixpioest=j_factor_prefetch( rg, st_systabstatsp,
      TRUE, jplan, ixpgest);
    if (!(NCI_COVERS(pcost) ) )
    {
      /*Get data pages physical I/O estimate*/
      dpgest=j_dpgs_pio_estimate(j, jplan, rg,
        totdpgs, dcsize, pagecount, st_systabstatsp,
        FALSE);
      /*Factor in sequential prefetch blk sizes*/
      dpioest=j_factor_prefetch(rg, st_systabstatsp,
        FALSE, jplan,dpgest);
    }
  }
  else
  {
    /*Get data pages physical I/O estimate*/
    dpgest=j_dpgs_pio_estimate(j, iplan, rg,
      totdpgs, dcsize, pagecount, st_systabstatsp, FALSE);
    /*Factor in sequential prefetch blk sizes*/
    dpioest=j_factor_prefetch(rg, st_systabstatsp,
      FALSE, jplan, dpgest);
  }
  /*Now deposit the estimate in pios*/
  pios=(pcost->cindid>CLUSTIND?(ixpioest+dpioest ):
    dpioest);
  // . . .
}
```

A j_factor_prefetch function factors in the buffer size and extent cluster ratios to estimate the physical I/Os for the given scan. It may be constructed as follows.

```
/*J_FACTOR_PREFETCH
**
This function factors in the buffer size and extent cluster
  ratios to estimate the physical
I/Os for the given scan. The generic formula for the factoring
  in prefetch is as follows:
**pio=Est. of large I/Os for pages which are well clustered+
**Est. of additional large I/Os for pages which are nonclus-
  tered
**pio=((Extent_Cluster_Ratio*pages)/rowsperpage)+
**(1- Extent_Cluster_Ratio*pages)
However, there are exception to the rule
In cases of OAM page based table scans in DOL tables, the
  OAM pages, Allocation pages and all extent 0 data pages
  cannot be prefetched. Therefore these pages added as
  additional I/Os. Moreover, in OAM page based scan
  Extent Cluster Ratio is assumed to be 100%.
Parameters:
**rg—Range Pointer
st_systabstatsp—pointer to SYSTABSTATS statistics for
  this index
**ixpgs—A boolean to indicate if index I/Os are being
  estimated.
**jplan—JPLAN for current variable
**input_ioest—the input to the function (estimated physi-
  cal
**page reads in SYBPAGESIZE units).
Side Effects: none
Returns: factored physical I/O estimate for the given scan.
*/
SYB_STATIC pagect_t j_factor_prefetch(VRANGE*rg,
  ST_SYSTABSTATS
*st_systabstatsp, SYB_BOOLEAN ixpgs, JPLAN*jplan,
  pagect_t input_ioest)
{
  /*If pmethod is REFORMAT don't fetch stat. from
    systabstats*/
  if (jplan->pmethod==J_REFORMAT)
  {
    /*Fetch magic page cluster ratios*/
    dpcr=MAGIC_CLUSTER_RATIO;
    pcr=MAGIC_CLUSTER_RATIO;
  }
```

```
dpcr=st_systabstatsp->st_dpagecratio;
ipcr=st_systabstatsp->st_ipagecratio;
/*The % of non-prefetchable pages is proportional to the
    scan size.
Assume crows/totrows to provide anapproximation of this
    %*/
if ( (pcost->cindid >TABENTRY ) && ( pcost->cstrategy
    &
    I_SEQ_IXPREFETCH|I_SEQ_DTPREFETCH) ) )
{
    /*Get the SYSTABSTATS handle for indid=0*/
    tst_systabstatsp=
        st_gettabstatinfo(rg->rgnondiskres->rgtabstatp-
            >st_systabstats,
        TABENTRY, objsdes, 14);
    SYB_ASSERT(tst_systabstatsp);
}
/*When we factor for large block I/Os we are venturing
    into divide by
**zero territory. Ensure that denominators!=0.0*/
/*Ensure a valid index page fetch size*/
SYB_ASSERT(pcost->cifetchsize>=
    KUNITS_FROM_BYTES(SYBPAGESIZE) );
/*Ensure a valid data page fetch size*/
SYB_ASSERT( pcost->cdfetchsize>=
    KUNITS_FROM_BYTES(SYBPAGESIZE) );
/*Index pages are being processed now*/
if (ixpgs)
{
    if (pcost->cstrategy & I_SEQ_IXPREFETCH)
    {
        /*Get estimate of index pgs that cannot be
            prefetched. # of
        non-prefetchable index pages for this scan*/
        npftchixpgs=IOEST_NONPRFTCHABLE_
            IXPAGES(
                st_systabstatsp, npftchpct);
        /*Est. # of physical I/Os to be incurred for the given
            buffer size.*/
        IOEST_PRFTCH_SCAN( (input_ioest—
            npftchixpgs),
        pcost->cifetchsize, ipcr, output_ioest);
        output_ioest+=npftchixpgs;
    }
    else
    {
        output_ioest=input_ioest;
    }
}
else
{
    if (pcost->cstrategy & I_SEQ_DTPREFETCH)
    {
        /*Est. # of pI/Os incurred for work/fake table for
            given
        buffer size.*/
        if ( (rg->rgtabid<0)||(rg->rgstat & RG_FAKEOBJ)||
            (rg->rgstat & RG_TMP_TO_BE)
        {
            dpcr=MAGIC_CLUSTER_RATIO;
            IOEST_PRFTCH_SCAN(input_ioest, pcost-
                >cdfetchsize,
            dpcr, output_ioest);
        }
        /*Est. pI/Os incurred for data pages of the
            given index or table scan.*/
        else
        {
            /*Get est. of data pgs that cannot be prefetched
                for
            the given scan. # of non-prefetchable data
                pages.*/
            npftchdpgs=TOEST_NONPRFTCHABLE_
                DPAGES(
                    st_systabstatsp, npftchpct);
            IOEST_PRFTCH SCAN( (input_ioest_
                npftchdpgs),
            pcost->cdfetchsize, dpcr, output_ioest);
            output_ioest+=npftchdpgs;
        }
    }
}
./*If after factoring prefetch ioest==0, make it=1.0*/
output_ioest=(output_ioest>=1.0)?output_ioest 1.0;
return(output_ioest);
}
```

E. Storage and Maintenance

The DPCR and IPCR are not maintained in their derived forms in the statistics catalog. However, the set of raw numbers used in the derivation of DPCR and IPCR are maintained in the SYSTABSTATS (system table statistics) catalog of ASE 11.9. The raw numbers are generated when the user creates an index or updates the statistics on a given table. Additionally, to maintain the accuracy of DPCR and IPCR, the raw numbers are dynamically updated in the in-memory copy of the SYSTABSTATS row with every insert/delete operation and are periodically flushed to the SYSTABSTATS catalog. The following are the scenarios and sequence of events that take place during dynamic maintenance of the raw numbers. 1. Inserts (a) Nonclustered Index 1. Insert Into a Leaf Page An insert operation in this section refers to insert into a leaf page and/or insert into a data page. If inserting an index leaf row causes a new page to be allocated such that the new page is not in the same extent as the preceding index leaf page and not in the succeeding index leaf page extent as well, and preceding and succeeding index leaf pages are in the same extent, then bump up the t_idextent_extraio counter by 2.

If for the above case preceding and succeeding index leaf pages happen to be in a different extent before this new allocation, t_idextent_extraio is bumped up by 1. If the newly allocated leaf page does not have either a successor or a predecessor leaf page, then bump up the same counter by 1, else leave the counter unchanged. If a new index leaf page has been allocated, bump up counter t_nidpages by 1.

2. Insert Into a Data Page

Suppose that the insert of datarow d1 causes an insertion of index leaf row i1. Let i2 and i3 be the index leaf rows before and after i1, and let i2 and i3 point to d2 and d3 respectively. Note that i2 and i3 can actually be in different index pages. If d1 is not in the same page as d2 and d3, and also if d2 and d3 are in the same page, then bump the counter t_page_extraio by 2.

If for the above case, i.e., d1 is not in the same page as d2 and d3, and the preceding and succeeding datarows d2 and d3 fall in different data pages before the new allocation, the counter t_page_extraio is to be bumped up by 1. If i1 does not have either a preceding or succeeding indexrows (i2 or i3), and the datarows d2 or d3 is in a different page than the newly allocated page for d1, the counter t_page_extraio will be bumped by 1, else leave it unchanged. Again, if the page for d1 is not in the same extent as d2 and d3, and if d2 and d3 belong to same extents before allocation, then bump counter t_dextent_extraio by 2. If the page for d1 is not in same extent as d2 and d3, and if d2 and d3 belong to different extents before the allocation then bump the counter t_dextent_extraio by 1. If i1 does not have either a preceding or succeeding index row (i2 or i3), and datarow d2 or d3 is in a different extent than d1, the same counter will be bumped by 1, else leave it unchanged. If a new datapage is allocated as a result of the insert, then bump up the count t_ndpages by 1.

(b) Allpages Clustered Index

1. Insert Into a Data Page

If inserting into a datapage for an Allpages table causes a new page to be allocated such that the new page is not in same extent as the preceding and succeeding data pages, and if the preceding and succeeding datapages are in the same extent before the allocation, then bump up the t_idextent_extraio counter by 2. If the newly allocated page is not in the same extent as the preceding and succeeding data pages, and if preceding and succeeding data pages are not in the same extent before the allocation, then bump up the t_idextent_extraio counter by 1. If the newly allocated page does not either have a successor or a predecessor page, then bump up the t_idextent_extraio by 1, else leave the counter unchanged. If a new data page has been allocated, bump up the counter t_ndpages by 1.

2. Deletes (a) Delete from the Leaf Page

The delete has been expressed as a delete from the index leaf page and delete from the data page. If deleting an index leaf row causes an index leaf page to be deallocated, and that leaf page belongs to a different extent than the preceding and succeeding index leaf pages, and also if the preceding and succeeding leaf pages belong to the same extent, then decrement the counter t_idextent_extraio by 2. If the deallocated leaf page belongs to a different extent than the preceding and succeeding index leaf pages, and also if the preceding and succeeding leaf pages belong to different extents, then decrement the counter t_idextent_extraio by 1. If this deallocated leaf page has either no preceding or succeeding leaf page, and the preceding/succeeding leaf page belonged to a different extent, then the counter t_idextent_extraio is to be decremented by 1, else leave it unchanged. If a new index leaf page has been deallocated, decrement counter t_nidpages by 1.

(b) Delete from a Data Page

Let us say that the delete of datarow d1 causes a deletion of index leaf row i1. Let i2 and i3 be the index leaf rows before and after i1, and let i2 and i3 point to d2 and d3 respectively. Note that i2 and i3 can actually be in different index leaf pages. If d1 is not in the same page as d2 and d3, and if d2 and d3 belong to the same page, then decrement the counter t_page_extraio by 2. If for the above case, if d1 is not in the same page as d2 and d3, and if d2 and d3 belong to different data pages, then decrement the counter t_page_extraio by 1. If i1 does not either have a preceding or succeeding indexrows (i2 or i3), and the datarow d2 or d3 is in a different data page than d1, the counter t_page_extraio will be decremented by 1, else leave it unchanged.

With reference to above and assuming that i1 has a preceding and succeeding index row (i2 and i3 respectively), if d1 is not in the same extent as d2 and d3, and if d2 and d3 fall in the same extent, then decrement counter t_dextent_extraio by 2. Again with reference to above, assuming that i1 has a preceding and succeeding index row (i2 and i3 respectively), if d1 is not in same extent as d2 and d3, and if d2 and d3 fall in different extents, then decrement counter t_dextent_extraio by 1. If i1 does not have either a preceding or succeeding indexrows (i2 or i3), and the datarow d2 or d3 is in a different extent than d1, the same counter t_dextent_extraio will be decremented by 1, else leave it unchanged. If a datapage is deallocated as a result of delete then decrement t_ndpages by 1.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system having a processor, a memory, and a storage device, said storage device storing a database comprising database tables, each table having rows of data records stored on data pages for the table, at least some of the tables being indexed by one or more indexes, a method for determining an optimal query plan for providing access to particular data records pursuant to a database query, the method comprising:

(a) determining fist information for indicating how well clustered consecutive data pages are for a given table, with respect to access of the data pages of the given table per a given index order;

(b) determining second information for indicating how well clustered index leaf pages are for a given index of the given table that provides said given index order, with respect to access of the index leaf pages of the given index;

(c) receiving a database query specifying selection of particular ones of said data records; and (d) based on said first and second information, determining an optimal query plan for executing said database query, including determining whether or not said query plan uses large block Input/Output (I/O) strategy for providing access to data records that satisfy the database query.

2. The method of claim 1, wherein said first information indicates how well clustered the consecutive data pages of the given table are in an extent comprising a fixed group of pages.

3. The method of claim 1, wherein said first information is determined on a per index basis, for each index on said given table.

4. The method of claim 1, wherein said first information enables calculation of a data page cluster ratio indicating ordering and density of data pages with respect to access of the data pages via a given index.

5. The method of claim 4, wherein a lower data page cluster ratio indicates a greater need for additional large block Input/Output (I/O) access, and vice versa.

6. The method of claim 1, wherein said step of determining an optimal query plan includes estimating, based on said first information, how much large block Input/Output (I/O) access of said data pages is optimal for executing the database query.

7. The method of claim 1, wherein said first information is derived from a scan of the given table.

8. The method of claim 1, wherein said first information is derived from a scan of an index on the given table.

9. The method of claim 1, wherein said first information is derived whenever an index is created for the given table.

10. The method of claim 1, wherein said first information is derived whenever system statistics for the given table are updated.

11. The method of claim 1, wherein said first information is derived whenever system statistics for the given index are updated.

12. The method of claim 1, wherein said step of determining an optimal query plan includes estimating, based on said second information, how much large block Input/

Output (I/O) access of said index leaf pages is optimal for executing the database query.

13. The method of claim 1, wherein said second information indicates how well clustered the index leaf pages of the given index are in an extent comprising a fixed group of index leaf pages.

14. The method of claim 1, wherein said second information enables calculation of an index page cluster ratio indicating ordering and density of the index leaf pages for the given index order.

15. The method of claim 1, wherein said second information is derived whenever the given index is created.

16. The method of claim 1, wherein said second information is derived whenever system statistics for the given index are updated.

17. The method of claim 1, wherein said step of determining an optimal query plan includes:
 based on said first information, calculating a data page cluster ratio indicating ordering and density of data pages with respect to access of the data pages via a given index; and
 based on said second information, calculating an index page cluster ratio indicating ordering and density of the index leaf pages for the given index order.

18. The method of claim 1, wherein said first and second information are maintained in a system statistics table of the database.

19. The method of claim 1, wherein said step of determining an optimal query plan includes determining whether large block I/O is cost-effective.

20. The method of claim 1, wherein said step of determining an optimal query plan includes determining whether said given index is optimal for execution of the database query.

21. The method of claim 1, wherein said database query specifies at least one database join condition for joining at least two database tables, and wherein said step of determining an optimal query plan includes estimating the cost of physical I/O for various join enumeration.

22. In a database system storing a database comprising database tables, each table having rows of data records stored on data pages for the table, at least some of the tables being indexed by one or more indexes, a method for determining an efficient access path for retrieving particular data records pursuant to database queries, the method comprising:
 (a) determining how well data pages are packed for a given table, with respect to access of the data pages per a given index order;
 (b) determining how well index leaf pages are packed for a given index on the given table per said given index order, with respect to access of the index leaf pages of the given index;
 (c) receiving a database query specifying retrieval of particular ones of said a records; and
 (d) based on how well the data pages are packed and how well the index leaf pages for packed, determining an efficient access path for executing said database query, including determining whether or not to use large block Input/Output (I/O) when executing said database query.

23. The method of claim 22, wherein step (d) includes:
 formulating a query plan including an optimized large block Input/Output (I/O) strategy for fetching data records that satisfy the database query.

24. The method of claim 22, wherein said packing of said data pages indicates how well clustered the consecutive data pages of the given table are in an extent comprising a fixed group of pages.

25. The method of claim 22, wherein said packing of said data pages is determined on a per index basis, for each index on said given table.

26. The method of claim 22, wherein said determination of said packing of said data pages enables calculation of a data page cluster ratio indicating ordering and density of data pages with respect to access of the data pages via a given index.

27. The method of claim 26, wherein a lower data page cluster ratio indicates a greater need for additional large block Input/Output (I/O) access for retrieving data records, and vice versa.

28. The method of claim 22, wherein said step of determining an efficient access path includes estimating, based on said packing of said data pages, how much large block Input/Output (I/O) access of said data pages is optimal for executing the database query.

29. The method of claim 22, wherein said packing of said data pages is determined from a scan of the given table.

30. The method of claim 22, wherein said packing of said data pages is determined from a scan of an index on the given table.

31. The method of claim 22, wherein said packing of said data pages is determined whenever an index is created for the given table.

32. The method of claim 22, wherein said packing of said data pages is determined whenever system statistics for the given table are updated.

33. The method of claim 22, wherein said packing of said data pages is determined whenever system statistics for the given index are updated.

34. The method of claim 22, wherein said step of determining an efficient access path includes estimating, based on said packing of index leaf pages, how much large block Input/Output (I/O) access of said index leaf pages is optimal for executing the database query.

35. The method of claim 22, wherein said packing of index leaf pages indicates how well clustered the index leaf pages of the given index are in an extent comprising a fixed group of index leaf pages.

36. The method of claim 22, wherein said determination of the packing of index leaf pages enables calculation of an index page cluster ratio indicating ordering and density of the index leaf pages for the given index order.

37. The method of claim 22, wherein said packing of index leaf pages is determined whenever the given index is created.

38. The method of claim 22, wherein said packing of index leaf pages is determined whenever system statistics for the given index are updated.

39. The method of claim 22, wherein said step of determining an efficient access path includes:
 based on said packing of data pages, calculating a data page cluster ratio indicating ordering and density of data pages with respect to access of the data pages via a given index; and
 based on said packing of index leaf pages, calculating an index page cluster ratio indicating ordering and density of the index leaf pages for the given index order.

40. The method of claim 22, wherein information about said packing of data pages and information about packing of index leaf pages are maintained in a system statistics table of the database.

41. The method of claim 22, wherein said step of determining an efficient access path includes determining whether large block I/O is cost-effective.

42. The method of claim 22, wherein said step of determining an efficient access path includes determining whether said given index is optimal for execution of the database query.

* * * * *